(12) United States Patent
Ahmad et al.

(10) Patent No.: US 12,019,292 B2
(45) Date of Patent: Jun. 25, 2024

(54) PHOTOINDUCED OPTICAL INTERCONNECT

(71) Applicant: OFS Fitel, LLC, Norcross, GA (US)

(72) Inventors: Raja A Ahmad, South Bound Brook, NJ (US); David J DiGiovanni, Mountain Lakes, NJ (US)

(73) Assignee: OFS FITEL, LLC, Norcross, GA (US)

( * ) Notice: Subject to any disclaimer, the term of this patent is extended or adjusted under 35 U.S.C. 154(b) by 432 days.

(21) Appl. No.: 17/415,571

(22) PCT Filed: Dec. 16, 2019

(86) PCT No.: PCT/US2019/066492
§ 371 (c)(1),
(2) Date: Jun. 17, 2021

(87) PCT Pub. No.: WO2020/149969
PCT Pub. Date: Jul. 23, 2020

(65) Prior Publication Data
US 2022/0057586 A1 Feb. 24, 2022

Related U.S. Application Data

(60) Provisional application No. 62/792,663, filed on Jan. 15, 2019.

(51) Int. Cl.
*G02B 6/43* (2006.01)
*G02B 6/42* (2006.01)

(52) U.S. Cl.
CPC ............ *G02B 6/43* (2013.01); *G02B 6/4212* (2013.01)

(58) Field of Classification Search
USPC .......................................... 385/37
See application file for complete search history.

(56) References Cited

U.S. PATENT DOCUMENTS

2008/0245108 A1* 10/2008 Kim ................... G02B 6/13
  65/386
2012/0106893 A1* 5/2012 Kashyap ............ G02B 6/02133
  65/529
2018/0314151 A1* 11/2018 Koch .................... B29D 11/00

* cited by examiner

*Primary Examiner* — Jerry M Blevins
(74) *Attorney, Agent, or Firm* — Sam S. Han, Esq.

(57) ABSTRACT

A photoinduced refractive index-changing material is coupled directly to both a first port and a second port. An optical interconnect structure (for optically coupling the first port to the second port) is formable in the photoinduced refractive index-changing material by selectively exposing a portion of the photoinduced refractive index-changing material. The selective exposure induces a refractive index change in the photoinduced refractive index-changing material. The change in refractive index provides the waveguiding properties of the optical interconnect structure.

16 Claims, 1 Drawing Sheet

PHOTOINDUCED OPTICAL INTERCONNECT

CROSS REFERENCE TO RELATED APPLICATIONS

This application claims the benefit of U.S. provisional patent application Ser. No. 62/792,663, filed 2019 Jan. 15, by Ahmad, having the title "Reconfigurable Self-Writing Optical Devices as Efficient Optical Interconnects," which is incorporated herein by reference in its entirety.

BACKGROUND

Field of the Disclosure

The present disclosure relates generally to optics and, more particularly, to optical interconnects.

Description of Related Art

Interconnects between an optical fiber and an integrated circuit (IC) chip are based typically on a connector with a V-groove, which permits the fiber core to align with the chip waveguide. Mechanical interconnects between two optical fibers often use high-precision ferrules that align precisely the cores of the interconnected fibers.

Because misalignment results in loss, it is important to control mechanical tolerances in the interconnect along with the sizes and shapes of the mode fields.

SUMMARY

The present disclosure provides for photoinduced optical interconnects. Briefly described, one embodiment of the system comprises a photoinduced refractive index-changing material coupled directly to both a first port and a second port. An optical interconnect structure (for optically coupling the first port to the second port) is formable in the photoinduced refractive index-changing material by selectively exposing a portion of the photoinduced refractive index-changing material. The selective exposure induces a refractive index change in the photoinduced refractive index-changing material. The change in refractive index provides the waveguiding properties of the optical interconnect structure.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
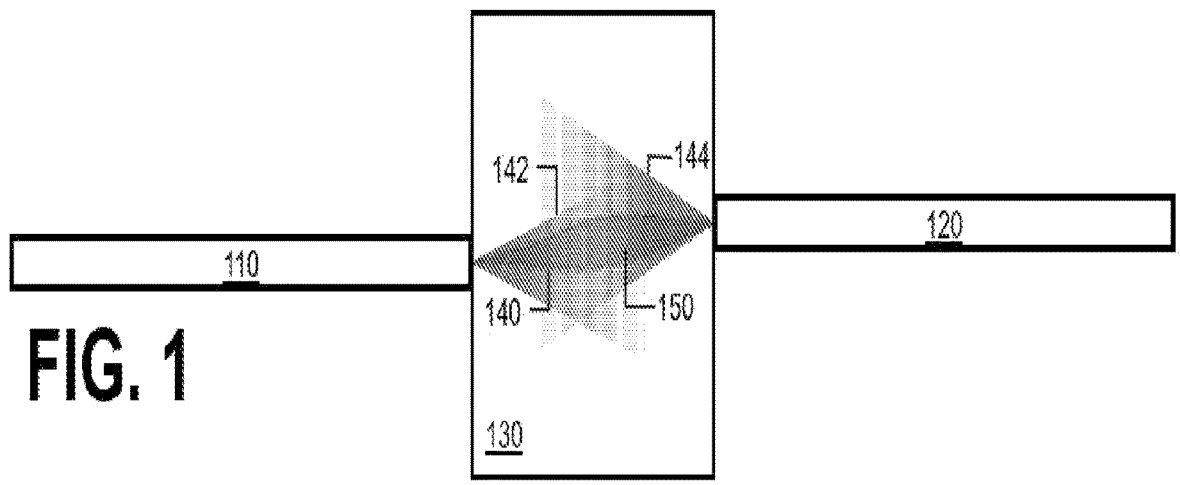
FIG. 1 is a diagram showing one embodiment of a system having a dynamically-formable optical interconnect structure formed with bidirectionally launched light in which a first port and a second port are misaligned.

A few approaches to fabricating optical interconnects are known. Interconnects between an optical fiber and a chip (whether an emitter or planar waveguide) are typically based on a connector which contains a V-groove slot for the fiber located in such a way that the waveguiding-core of the fiber is aligned to the emitter or chip waveguide. Bragg reflector on chips or tapered waveguides can be used to obtain light coupling. Mechanical fiber-to-fiber coupling uses fixturing of the fiber in high-precision ferrules which are aligned precisely to each other mechanically.

These solutions, however, fall short of suppressing losses due to misalignment of the waveguides from simple mechanical tolerances as well as mismatch in modefield size or shape. For example, the core offset in standard singlemode fiber can be as high as one (1) micrometer ($\mu$m), thereby limiting the precision of non-active core alignment. Also, conventional approaches do not suppress Fresnel reflection without index-matching gels or antireflective coatings and, therefore, exhibit limited performance towards achieving a lossless coupling solution. Because extremely high precision is required to achieve sufficiently-low optical loss, fixturing using conventional approaches is not scalable in volume or cost. This problem is compounded with multi-core fibers, multi-waveguide photonic-integrated-chips and multi-fiber cables.

One approach to improved interconnection involves the use of a photosensitive material as a bridge (or intermediate) waveguide, where the waveguides or holographic devices of arbitrary dimensions and refractive-index-profiles can be created by photo-exposure before or after the waveguide(s) have been positioned. The use of intermediate or bridge waveguides is serial in nature and, thus, also not scalable.

Others, such as Aljada, et al., in High-speed (2.5 Gbps) reconfigurable inter-chip optical interconnects using opto-VLSI processors (2006 Jul. 24, Vol. 14, No. 15, Optics Express 6823), used standard digital phase holography, where liquid crystals are used as a reconfigurable material for steering beams in reflection mode. There are many limitations to such approaches when used for low-loss, large-scale, and fully-reconfigurable applications because the materials used in Aljada results in a different effect.

This disclosure ameliorates several of these disadvantages by providing for high volume, low cost, high density, scalable interconnections between an optical fiber and other optoelectronic devices, which are tolerant to physical displacement and mismatch of waveguides. For example, this disclosure teaches leveraging of photo-induced responses to direct, steer, and/or guide light, which is conceptually different from standard digital phase holography using liquid crystals.

Briefly, this disclosure teaches a platform that provides reconfigurable optical interconnections for multiple optical ports, e.g., cores within a fiber, waveguides on a chip, fibers within a cable, lasers-sources, etc. The platform facilitates creation and control of optical paths in a passive configuration, providing dynamically reconfigurable optical circuitry for low-loss and high-density optical interconnections.

The fabrication of the optical interconnection is accomplished by intensity-based refractive-index-changes due to a self-trapping of light, which results from a balance between diffraction and self-focusing of launched light. In one embodiment the light is launched from one of the waveguides to be interconnected. In other embodiments, the light is launched from both of the waveguides to be interconnected. In yet other embodiments, one of the waveguides launches light and the other waveguide back-reflects light. The back-reflected light is due to either Fresnel reflection from its far-end termination or due to interference-based optical structures, such as gratings and lenses, based on holograms.

The fabrication of such optical interconnects can be accomplished by using single-photon absorption processes, multi-photon absorption processes, or both. This is because the photosensitive material may undergo a refractive-index change due to the single-photon and/or multi-photon absorption, which results in the formation of a self-written structure that can guide and deliver light over its length. Such self-written structures can be optically erasable and re-writable, electrically erasable and re-writable, or thermally erasable and re-writable. The advantage of using multi-photon absorption is the availability of high-power light sources at certain frequencies that may, or may not, fall within the absorption-frequencies-window of the platform-material.

Having provided a broad technical solution to a technical problem, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 2:
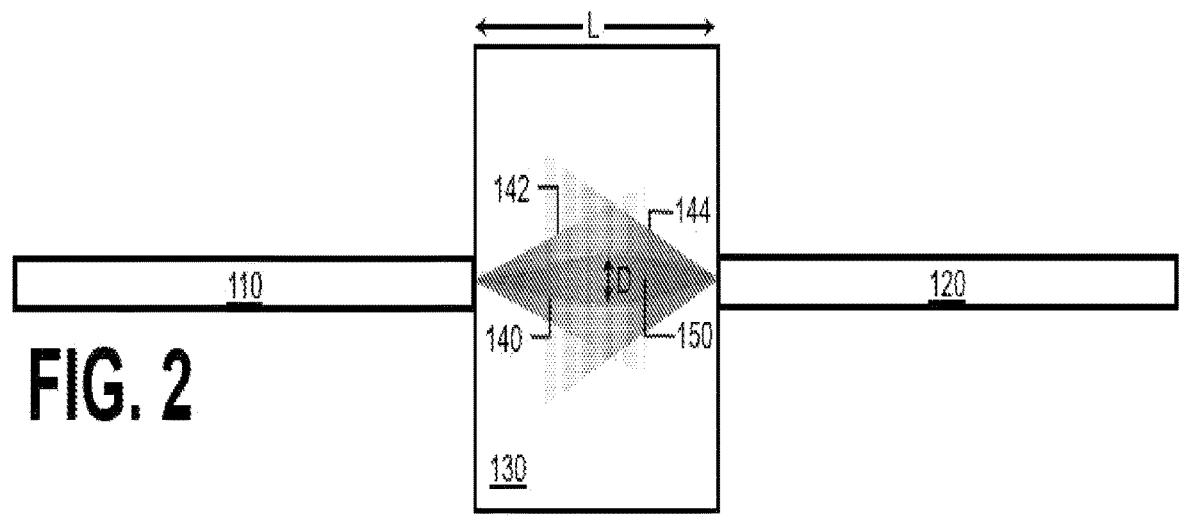
FIG. 2 is a diagram showing one embodiment of a system having a dynamically-formable optical interconnect structure formed with bidirectionally launched light in which a first port and a second port are aligned.

FIG. 1 is a diagram showing one embodiment of a system having a dynamically-formable optical interconnect structure formed with bidirectionally launched light in which a first port and a second port are misaligned. Unlike FIG. 1, the embodiment of FIG. 2 is a system formed with bidirectionally launched light in which a first port and a second port are aligned.

As shown in the system of FIG. 1, one embodiment of the system comprises a first port 110 (such as an input port). The first port can be a laser source, an integrated circuit (IC) chip comprising a waveguide, an optical fiber, or any other optical light source. The system further comprises a second port 120 (such as an output port), which can also be a laser source, an IC chip with a waveguide, an optical fiber, etc. The optical fiber can be either a single-core optical fiber or a multicore optical fiber, depending on the technical application.

The embodiment of FIG. 1 further comprises a photoinduced refractive index-changing material 130 that is coupled directly to the first port 110. The photoinduced refractive index-changing material 130 can be a photopolymer, a chalcogenide, a dielectric, or a host of other materials that change their refractive indices when exposed to light. The photoinduced refractive index-changing material 130 is also coupled directly to the second port 120, thereby providing an optical pathway between the first port 110 and the second port 120.

Specifically, in the bidirectional embodiment shown in FIG. 1, light launched from the first port 110 exposes a first portion 142 of the photo-induced refractive index-changing material 130, while light launched from the second port 120 exposes a second portion 144 of the photoinduced refractive index-changing material 130. The selective exposure of light from the first port 110 and the second port 120 results in a dynamically-formable optical interconnect structure 130 between the first port 110 and the second port 120.

For some embodiments, the selective exposure of light induces a refractive index change of between 0.01 percent (%) and ten percent (10%), which creates a waveguide region 150 that is defined by the refractive index change. Preferably, the waveguide region 150 has a diameter (D) of between approximately 0.5 micrometers (μm) and twenty micrometers (20 μm). Furthermore, in one embodiment, the waveguide 150 has a length (L) that is less than approximately one (1) centimeter (cm). As is known in the art, the resulting structure can be designed to propagate light within a desired range of frequencies. Additionally, it is preferable that the dynamically-formable optical interconnect structure 130 comprises a loss of less than two (2) decibels (dB).

For some embodiments, the photoinduced refractive index-changing material 130 is a film, while in other embodiments the material 130 is a bulk material that is in the form of a cylinder or a block. Irrespective of the precise material, the photoinduced refractive index-changing material 130 can be deposited between two fibers containing one or more cores; two IC chips each containing one or more waveguides; two fiber ribbons each containing multiple fibers that contain one or more cores; a fiber ribbon containing multiple fibers that contain one or more cores and an integrated-chip containing one or more waveguides; one laser emitter and one fiber and/or IC chip waveguide; a group of closely-located laser emitters and one or more fibers containing one or more cores; a group of closely-located laser-emitters and one or more IC chips containing one or more waveguides; etc.

The waveguide region 150 (or the holographic pattern) may be of uniform or non-uniform diameter along its length (non-uniform diameter shown in FIG. 1); exhibit uniform or non-uniform refractive-index-contrast along its length (non-uniform refractive-index-contrast shown in FIG. 1); aligned along a straight path (as shown in FIG. 2) or tilted path (shown in FIG. 1) or curled path or any combination thereof between the two transverse-planes located at the start and end points of the self-written device; etc.

Figure 3:
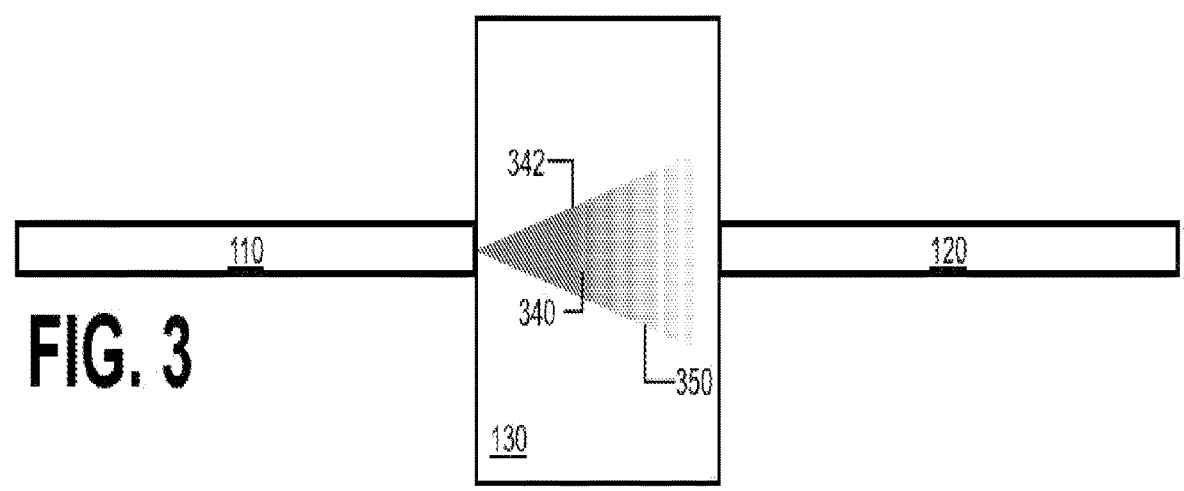
FIG. 3 is a diagram showing one embodiment of a system having a dynamically-formable optical interconnect structure formed with unidirectionally launched light.

FIG. 3 is a diagram showing one embodiment of a system having a dynamically-formable optical interconnect structure formed with unidirectionally launched light. Similar to FIGS. 1 and 2, the embodiment of FIG. 3 also comprises a photoinduced refractive index-changing material 130 that is coupled directly to a first port 110 and a second port 120. However, unlike FIGS. 1 and 2, the embodiment of FIG. 3 shows dynamically-formable optical interconnect structure 340 that is formed by launching light 342 unidirectionally from the first port 310. This unidirectional launch of light 342 produces a waveguide 350 that is different than the waveguide 150 of FIG. 1 or FIG. 2.

In a broad sense, the embodiments of FIGS. 1, 2, and 3 further provide a process in which light 342 is launched from the first port 110 and into the photoinduced refractive index-changing material 330. The launched light exposes a portion of the photoinduced refractive index-changing material, thereby inducing a refractive index change. Preferably, the refractive index change is between approximately 0.01% and 10% in the exposed portion. The induced refractive index change forms a dynamically-formable optical interconnect structure 340, which optically couples the first port 110 and the second port 120. As shown further in FIGS. 1 and 2, light 244 can also be launched from the second port 120 to further induce a refractive index change.

As noted above, the refractive index change can be induced by applying single-photon absorption or multi-photon absorption. For the embodiment of FIG. 3, the process further comprises balancing diffraction and self-focusing of the light launched from the first port 110 to form the dynamically-formable optical interconnect structure 340. Alternatively, for FIG. 3, the dynamically-formable optical interconnect structure 340 is formed by back-reflecting light launched from the first port 110.

For the embodiment of FIGS. 1 and 2, the process further comprises balancing diffraction and self-focusing of the light launched from the first port 110 and the light launched from the second port 120 to form the dynamically-formable optical interconnect structure 140.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A system, comprising:
   a first port selected from the group consisting of:
   a laser source;
   an integrated circuit (IC) chip comprising a waveguide; and
   an optical fiber;
   a second port selected from the group consisting of:
   a laser source;
   an IC chip comprising a waveguide; and
   an optical fiber;
   a photoinduced refractive index-changing material coupled directly to the first port, the photoinduced refractive index-changing material coupled directly to the second port, the photoinduced refractive index-changing material being selected from the group consisting of:
   a photopolymer;
   a chalcogenide; and
   a dielectric; and
   a dynamically-formable optical interconnect structure for optically coupling light between the first port and the second port, the dynamically-formable optical interconnect structure formable in the photoinduced refractive index-changing material by selectively exposing a portion of the photoinduced refractive index-changing material, the selective exposure comprising back-reflected light launched from the first port, the selective exposure inducing a refractive index change of between 0.01 percent (%) and ten percent (10%), the dynamically-formable optical interconnect structure comprising:
   a waveguide region defined by the refractive index change, the waveguide region having a diameter that is between 0.5 micrometers (μm) and twenty (20) μm;
   a loss of less than two (2) decibels (dB); and
   a length that is less than one (1) centimeter (cm).

2. A system comprising:
   a first port;
   a second port;
   a photoinduced refractive index-changing material coupled directly to the first port, the photoinduced refractive index-changing material further coupled directly to the second port; and
   an optical interconnect structure for optically coupling the first port to the second port, the optical interconnect structure formable in the photoinduced refractive index-changing material by selectively exposing a portion of the photoinduced refractive index-changing material, the selective exposure comprising back-reflected light launched from the first port, the selective exposure inducing a refractive index change in the photoinduced refractive index-changing material.

3. The system of claim 2, wherein the refractive index change is between 0.01 percent (%) and ten percent (10%).

4. The system of claim 2, wherein the optical interconnect structure comprises a waveguide region defined by the refractive index change, the waveguide region having a diameter that is between 0.5 micrometers (μm) and twenty (20) μm.

5. The system of claim 2, wherein the optical interconnect structure comprises a loss of less than two (2) decibels (dB).

6. The system of claim 2, wherein the optical interconnect structure comprises a length of less than one (1) centimeter (cm).

7. The system of claim 2, wherein the first port is one selected from the group consisting of:
   a laser source;
   an integrated circuit (IC) chip comprising a waveguide; and
   an optical fiber.

8. The system of claim 7, wherein the optical fiber comprises multiple cores.

9. The system of claim 2, wherein the second port is one selected from the group consisting of:
   a laser source;
   an integrated circuit (IC) chip comprising a waveguide; and
   an optical fiber.

10. The system of claim 9, wherein the optical fiber comprises multiple cores.

11. The system of claim 2, wherein the photoinduced refractive index-changing material is selected from the group consisting of:
    a photopolymer;
    a chalcogenide; and
    a dielectric.

12. In a system comprising a first port, a second port, and a photoinduced refractive index-changing material coupled directly to the first port, the photoinduced refractive index-changing material further coupled directly to the second port, a process comprising:
    launching light from the first port into the photoinduced refractive index-changing material;
    launching light from the second port into the photoinduced refractive index-changing material;
    exposing a portion of the photoinduced refractive index-changing material with the launched light from the first port;
    inducing a refractive index change of between 0.01 percent (%) and ten percent (10%) in the exposed portion; and
    back-reflecting light launched from the first port to form an optical interconnect that optically couples the first port and the second port, the optical interconnect being formed from the induced refractive index change.

13. The process of claim 12, wherein inducing the refractive index change comprises:

applying single-photon absorption to induce the refractive index change.

14. The process of claim 12, wherein inducing the refractive index change comprises:
applying multi-photon absorption to induce the refractive index change.

15. The process of claim 12, further comprising:
balancing diffraction and self-focusing of the light launched from the first port to form the optical interconnect.

16. The process of claim 12, further comprising:
balancing diffraction and self-focusing of the light launched from the first port and the light launched from the second port to form the optical interconnect.

* * * * *